United States Patent [19]

Kobashi et al.

[11] Patent Number: 4,794,152

[45] Date of Patent: Dec. 27, 1988

[54] BEAD-LIKE POLYMER AND PRODUCTION THEREOF

[75] Inventors: Toshiyuki Kobashi; Hideo Naka; Shoyo Takagi, all of Okayama, Japan

[73] Assignee: Japan Exlan Company Limited, Osaka, Japan

[21] Appl. No.: 827,213

[22] Filed: Feb. 4, 1986

Related U.S. Application Data

[63] Continuation of Ser. No. 612,788, May 22, 1984, abandoned.

[30] Foreign Application Priority Data

Jun. 10, 1983 [JP] Japan ................................ 58-104735
Jun. 15, 1983 [JP] Japan ................................ 58-108422

[51] Int. Cl.$^4$ .............................................. C08F 24/00
[52] U.S. Cl. ...................................... 526/273; 526/203; 526/320; 525/327.3; 428/402
[58] Field of Search ................ 526/273, 203, 320; 525/327.3; 428/402

[56] References Cited

U.S. PATENT DOCUMENTS

| | | | |
|---|---|---|---|
| 3,886,129 | 5/1975 | Kurz et al. | 526/320 |
| 3,966,847 | 6/1976 | Seiderman | 526/320 |
| 3,970,633 | 7/1976 | Miller et al. | 526/320 |
| 4,170,582 | 10/1979 | Mori et al. | 526/320 |
| 4,349,654 | 9/1982 | Ohmae et al. | 526/273 |

Primary Examiner—Joseph L. Schofer
Assistant Examiner—Peter D. Mulcahy
Attorney, Agent, or Firm—Wenderoth, Lind & Ponack

[57] ABSTRACT

A bead-like glycidyl (meth)acrylate polymer is produced by aqueous suspension polymerization of glycidyl (meth)acrylate alone or a monomer mixture composed of more than 50 weight % of said monomer and at least one other monomer which forms the remainder, in the presence of a specific aqueous polymer, at a pH of from 2 to 9 and at a stirring speed of from 50 to 500 r.p.m. By heat treating said bead-like polymer at a pH below 3 and at a temperature above 70° C., hydroxyl groups resulting from the ring opening of the epoxy groups are introduced, whereby a solvent-insoluble bead-like polymer having a gel water content not less than 30% is produced.

5 Claims, 1 Drawing Sheet

BEAD-LIKE POLYMER AND PRODUCTION THEREOF

This application is a continuation of now abandoned application Ser. No. 612,788, filed May 22, 1984.

BACKGROUND OF THE INVENTION (a) Field of the Invention

This invention relates to a method of producing a bead-like glycidyl (meth)acrylate (hereinafter referred to as G(M)A) as well as to a modified bead-like polymer produced from said polymer and to a method of producing the same.

(b) Description of the Prior Art

As the materials for shaping, polymers in the form of pellets, flakes, globules, fine particles, etc. are easy in handling. In some cases, it is convenient to produce particulate polymers from the start. Further, fields of use which require particulate polymers are not few, as latex diagnostic medicines, gels for use in liquid chromatography, lubricants, etc.

Polymers containing epoxy groups can be applied to various fields of use because a variety of functional groups can be introduced into them owing to their reactivity. For example in Japanese Pat. Kokai No. 96261/1982, there is disclosed a technique of producing immunization-active fine particles by reacting G(M)A polymer fine particles with an immunization-active substance having amino groups. According to said patent, it is described that the polymerization is carried out in a solvent which dissolves the monomer but precipitates the resulting polymer, and that by suitably selecting a monomer composition and polymerization medium, a G(M)A polymer in the form of fine particles of 0.03–10$\mu$ can be obtained. However, in this process, an organic solvent is used as the polymerization medium and in the washing step, etc. so that in conducting the process on an industrial scale, there are many problems to be taken into consideration, such as bad odor, in labor environment and safety. In use in fields such as liquid chromatographic gels, ion-exchange resins, etc., polymers having particle diameters usually from 20 to 1000$\mu$ are used, and an industrial production method of a globular polymer of such particle diameters is demanded.

In Journ. Chem. Soc. Japan, 1979 (12), pp 1756–1759, there is disclosed a method of producing a globular GMA polymer as a basic material for producing a chelating ion exchange resin. To obtain the globular polymer, large quantities of sodium sulfate and calcium carbonate are used as dispersing agents together with gelatine, and to decompose and remove the calcium carbonate from the resulting polymer, complicated operations are needed such as the addition of hydrochloric acid and washing with hot water.

In recent years, liquid chromatography is utilized not only as an analytical means but also as an industrial separation means in many fields such as food industry, medical products industry, synthesis and purification of chemical products and intermediates, inorganic industry, textile industry, etc. As the gels for use in such liquid chromatography, various gel products are being developed, such as dextran-cross-linked polymer gels, acrylamide-cross-linked polymer gels, cross-linked polystyrene gels, cross-linked polyvinyl acetate gels, cross-linked polyethylene glycol dimethacrylate gels, silanol-polyoxyethylene gels, etc. However, gels of high separation and treating abilities are generally expensive. For example, Cephadex gel (dextran cross-linked polymer gel) produced by Pharmacia Fine Chemical is excellent in performance but is very expensive, so that it is a problem to use it for industrial use in which a large quantity of gel is filled into enormous columns.

SUMMARY OF THE INVENTION

Under such circumstances, we have conducted research for industrially advantageous production of globular particles of an epoxy groups-containing polymer which have various reactivities resulting from the epoxy groups, but which generally have had the defect of tending to agglomerate into a clump because of the strong adhesive force of the resulting polymer particles. Also, we have conducted research to provide a modified bead-like polymer produced from said globular particles. As a result, we have found that, by using a specific water-soluble polymer as the dispersing agent and by aqueous suspension polymerization at a specific pH value and under stirring, it is possible to produce an epoxy group-containing globular polymer, and that by acid heat treating the thus-obtained polymer under specific conditions, hydroxyl groups resulting from the ring opening of the epoxy groups are introduced, whereby a bead-like polymer having a high separation ability can be provided in an industrially advantageous manner. The present invention has been accomplished based on this discovery.

Therefore, an object of the present invention is to provide an industrial method of producing a globular polymer containing epoxy groups and having various reactivities. Another object is to provide a hydrophilic, solvent-insoluble bead-like polymer having a large quantity of hydroxyl groups introduced therein due to the modification of the epoxy groups, and to provide a method for its industrial production.

Such objects of the present invention are attained by aqueous suspension polymerization of GA or GMA alone or a monomer mixture composed of more than 50 weight % of said polymer and at least one other monomer which forms the remainder, in the presence of a water-soluble polymer containing essentially monomer units consisting of an ethylenic unsaturated carboxylic acid or a salt thereof and monomer units consisting of an ethylenic unsaturated sulfonic acid or a salt thereof and an oil-soluble radical polymerization initiator, at a pH from 2 to 9 and at a stirring speed of 50 to 500 r.p.m.; and by heat treating the thus-obtained bead-like G(M)A polymer at a pH below 3 at a temperature above 70° C.

DETAILED DESCRIPTION OF THE PREFERRED EMBODIMENT

Figure 1:
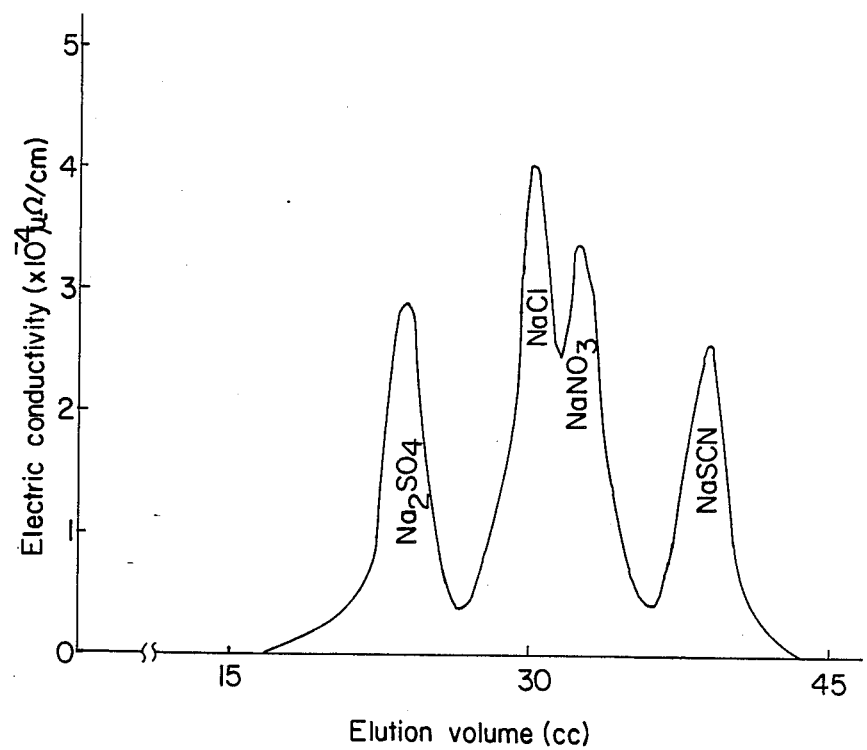

In the following, the present invention is explained in detail. Firstly, it is necessary to use as the monomer, G(M)A alone or a monomer mixture composed of more than 50 weight %, preferably more than 60 weight % of G(M)A and at least one other monomer which forms the remainder. As the other monomers, any monomers can be employed without limitation so far as they are copolymerizable with G(M)A. For example, there can be mentioned vinyl halides and vinylidene halides such as vinyl chloride, vinyl bromide, vinyl fluoride, vinylidene chloride, etc.; unsaturated carboxylic acids such as aclylic acid, methacrylic acid, maleic acid, itaconic acid, etc. and salts thereof; acrylic acid esters such as methyl acrylate, ethyl acrylate, butyl acrylate, octyl acrylate, methoxyethyl acrylate, phenyl acrylate, cyclohexyl acrylate, etc.; methacrylic acid esters such as methyl methacrylate, butyl methacrylate, octyl methacrylate, methoxyethyl methacrylate, phenyl methacrylate, cyclohexyl methacrylate, etc.; unsaturated ketones such as methyl vinyl ketone, methyl isophenyl ketone, etc.; vinyl esters such as vinyl formate, vinyl acetate, vinyl propionate, vinyl butyrate, vinyl benzoate, etc.; vinyl ethers such as methyl vinyl ether, ethyl vinyl ether, etc.; acrylamide and alkylsubstituted compounds thereof; unsaturated hydrocarbon sulfonic acids such as vinylsulfonic acid, allylsulfonic acid, methallysulfonic acid, p-styrenesulfonic acid, etc. and salts thereof; styrene and alkyl or halogen substituted compounds thereof such as α-methylstyrene, chlorostyrene, etc.; allyl alcohols and esters or ethers thereof; basic vinyl compounds such as vinyl pyridine, vinylimidazole, dimethylaminoethyl methacrylate, etc.; vinyl compounds such as acrolein, methacrolein, vinylidene cyanide, methacrylonitrile, etc. According to need, it is also possible to form cross-links in the polymer by using cross-linkable monomers such as divinylbenzene, ethylene glycol dimethacrylate, diethylene glycol dimethacrylate, N,N'-methylenebisacrylamide, divinyl succinate, diallyl succinate, vinyl methacrylate, ally methacrylate, triallyl cyanurate, triallyl isocyanurate, etc.

The polymerization method employed in the present invention which uses such monomers is characterized by aqueous suspension polymerization in the presence of a specific water-soluble polymer and an oil-soluble radical polymerization initiator, at a specific pH and a stirring condition. In polymerizing an epoxy-containing monomer in an aqueous system, the resulting polymer is generally liable to agglomerate into a lump because of its strong adhesive force. As opposed thereto, in the case of the method of the present invention, the specific water-soluble polymer present in the polymerization system, together with the action of stirring, prevents the agglomeration of the resulting polymer to produce uniform globular polymer particles.

As the water-soluble polymer to be added to the polymerization system which is an especially important requisite for this polymerization method, it is necessary to use a water-soluble polymer which contains both of monomer units (A component) consisting essentially of an ethylenic unsaturated carboxylic acid or a salt thereof and monomer units (B component) consisting of an ethylenic sulfonic acid or a salt thereof. Any water-soluble polymers obtained by any method can be effectively used in the present invention so far as the polymers finally contain both the A and B components. However, such polymers can be generally produced by copolymerizing the A and B components by a known method, especially by the solution polymerization using water as the polymerization medium. Of course, it is also possible to employ a method of introducing the A component by hydrolyzing a copolymer containing copolymerized therein an unsaturated carboxylic acid ester, or a method of introducing the B component by sulfonating the polymer.

The ratio of the A component and B component in the water-soluble polymer is different to a certain extend depending on the copolymerization ratio of G(M)A or the kind of ther monomers, so that it is difficult to limit it definitely. However, it is desirable that the ratio of the A component to the B component should be generally in the range of 30–80%/70–20%. Also, the degree of polymerization of the polymer is not particularly limited, but in the practical molecular weight range, the use of a polymer of a lower molecular weight is more advantageous in handling, and in addition it is more effective for the prevention of globular polymer particles from union and agglomeration. Further, depending on the kind of the other monomers, there are cases where a better globular polymer can be obtained when using as the water-soluble polymer, a water-soluble polymer containing the A and B components and further copolymerized or graft-polymerized with a small quantity of a hydrophobic monomer such as vinylidene chloride. Accordingly, such polymers are also included in the scope of the water-soluble polymers used in the present invention.

The A components to be introduced into such a water-soluble polymer include unsaturated monovalent carboxylic acids such as acrylic acid, methacrylic acid, vinylacetic acid, crotonic acid, and salts thereof; and unsaturated polyvalent carboxylic acids such as maleic acid, fumaric acid, itaconic acid, aconitic acid, citraconic acid, mesaconic acid, etc. and salts thereof. However, in respect of better formation of globular polymers, the introduction of monomer units composed of methacrylic acid or a salt thereof is especially recommended. As the B components there may be mentioned sulfonated unsaturated hydrocarbons such as sulfonated styrene, allysulfonic acid, methallysulfonic acid, etc. and salts thereof; acrylic or methacrylic acid sulfoalkyl esters such as methacrylic acid sulfoethyl ester, methacrylic acid sulfopropyl ester, and salts thereof.

As regards the quantity of such a water-soluble polymer to be used, it is difficult to prescribe it definitely. However, it is desirable to use more than 5 weight % based on the monomer. Also, especially good results can be obtained when 0.1–5 weight %, based on the monomer, of polyvinyl alcohol (PVA) having a degree of polymerization of 500–2000 and a degree of saponification of 85–95%, is used together with said water-soluble polymer.

As the oil-soluble radical polymerization initiators, any can be employed without limitation so far as the objects of the present invention are attained. Preferable ones are the following azo compounds and organic peroxides: for example azo compounds such as 2,2'-azobisisobutyronitrile, 2,2'-azobis(2-methyl-valeronitrile), 2,2'azobis(2,4-dimethylbutyronitrile), 2,2'-azobis(2-methylcapronitrile), 2,2'-azobis(2,3,3-trimethylbutyronitrile), 2,2'-azobis(2,4,4-trimethylvaleronitrile), 2,2'-azobis(2,4-dimethylvaleronitrile), 2,2'-azobis(2,4-dimethyl-4-ethoxyvaleronitrile), 2,2'-azobis(2,4-dimethyl-4-n-butoxyvaleronitrile), etc.; organic peroxides such as acetyl peroxide, propionyl peroxide, isobutyryl peroxide, octanoyl peroxide, decanoyl peroxide, lauroyl peroxide, 3,5,5-trimethylhexanoyl peroxide, benzoyl peroxide, diacyl peroxides such as diisopropyl peroxydicarbonate, di-2-ethylhexyl peroxydicarbonate, etc.; peroxyesters such as t-butyl peroxyisobutylate, t-butyl peroxypivalate, t-butyl peroxyneodocanoate, t-butyl peroxylaurate, etc. Of course, a suitable combination of two or more of the above-mentioned radical polymerization initiators may be used. As regards the quantity of such an initiator to be used, it is difficult to prescribe it definitely. However, the initiator is used generally in the range of from 0.2 to 2.0 weight % based on the monomer.

As for the pH of the polymerization system, if the acidity is too strong, the ring opening of epoxy groups takes place upon the polymerization reaction, and if the alkalinity is too strong, the hydrolysis of the resulting polymer is caused. Therefore, it is necessary to determine it within the range of 2 to 9, preferably from 2 to 7.

The particle diameter of the bead-like polymer finally obtained is determined almost unequivocally depending on the size of the epoxy groups-containing globular polymer. As for the stirring condition which plays an important role in regulating the particle diameter of the globular polymer, it is necessary to vary it depending on the shape of the wings, the presence or absence of baffle plates, the particle diameter required, etc., so that it is difficult to determine it unequivocally. However, it is necessary to set the stirring speed generally within the range of from 50 to 500 r.p.m. As for the shape of the wings, paddle-shaped wings or turbine wings are suitable because they can give uniform distribution of particle diameters.

As for the polymerization temperature, the higher the temperature, the more the ring opening reaction of the epoxy groups occurs or the emulsion polymerization resulting from the emulsification of a part of the monomer, leading to the formation of latex-like fine polymer particles. Therefore, a temperature generally below 80° C., preferably a temperature range from 40° to 70° C. is recommended.

As for the polymerization medium, it is desirable to use water from the convenience of industrial operation. But it does not deviate from the scope of the present invention to make a water-miscible organic solvent or an electrolytic salt coexist in water, if desired.

The thus-obtained G(M)A globular polymer has a particle diameter generally above $10\mu$. Further, said polymer has a gel water content less than 20% and is solvent-insoluble. From this fact, it is supposed that some of the epoxy groups are ring-opened to introduce hydrophilic groups together with intramolecular or intermolecular cross-links.

The globular polymer produced according to such a polymerization method and having a particle diameter generally above $10\mu$ and a gel water content less than 20%, is then heat treated under the conditions of a pH below 3, preferably below 2.5, and a temperature above 70° C., preferably above 80° C. By this heat treatment, hydroxyl groups are introduced by the ring opening of epoxy groups in an industrially advantageous manner, and the polymer is converted to a bead-like polymer having a gel water content not less than 30%, preferably not less than 50%.

As for the acids used upon the acid heat treatment, it is possible to use, without limitation, any of inorganic acids such as nitric acid, sulfuric acid, hydrochloric acid, phosphoric acid, etc. and organic acids such as acetic acid, formic acid, citric acid, malic acid, etc.

The time required for the heat treatment is different depending on the heat treatment conditions (pH, temperture), so that it is difficult to prescribe it unequivocally. However, since it is desirable to minimize the residual quantity of the epoxy groups, it is set generally within the range of from 0.5 to 5 hours. Thus, substantially all i.e. all but a residual quantity of epoxy groups are ring-opened.

As for the mode of the heat treatment operation, any of the following methods may be employed: a method wherein the G(M)A globular polymer is once separated from the aqueous suspension and after washing and dehydration the polymer is made into a slurry again in water, and then the slurry is heat treated; and a method wherein after polymerization a prescribed quantity of an acid is added directly to the polymer suspension and then the suspension is heat treated.

Thus we have succeeded in producing, by an industrial method, globular particles of a G(M)A polymer having various reactivities resulting from the epoxy groups and applicable to a variety of industrial fields but which heretofore have had the defect of tending to agglomerate into a clump because of the strong adhesive force of the resulting polymer particles. Also we have succeeded in providing, by modifying said globular particles, a hydrophilic (gel water content not less than 30%) and solvent-insoluble bead-like polymer having a high separation performance, without causing any problems in labor environment and safety, and without requiring any complicated processes. These are the effects of the present invention worthy of special mention.

The bead-like G(M)A polymer and its modified polymer according to the present invention can be widely used in various fields such as modifying agents for plastics, fibers, films, etc. Among others, the modified bead-like polymer, as is or after acylating or alkylating part of the hydroxyl groups, can be used favorably as a gel for use in liquid chromatography.

The present invention is explained in more detail by way of Examples, but the invention is not limited for its scope by these Examples, wherein parts and percentages are by weight unless otherwise indicated.

The gel water content is obtained by the following method: The polymer particles are brought into a sufficient equilibrium with deionized water and after the water adhering to the particle surface is removed by a centrifuge of a centrifugal effect of 2000 G for 5 minutes, the weight of the polymer particles is measured ($W_1$). After drying the polymer particles, the weight ($W_2$) is measured. The gel water content is obtained by the following formula:

$$\text{Gel water content} = \frac{W_1 - W_2}{W_2} \times 100(\%)$$

EXAMPLE 1

Twenty parts of a water-soluble polymer composed of methacrylic acid and sodium p-styrenesulfonate in the ratio of 70:30, and 2 parts of PVA (degree of polymerization: 1000; degree of saponification 87%) were dissolved in 778 parts of water, and the solution was put into a polymerization tank equipped with a paddle-shaped stirrer. Then a solution of 2 parts of 2,2'-azobis(2,4-dimethylvaleronitrile) in 200 parts of GMA was added to the polymerization tank. Polymerization was carried out under stirring at 300 r.p.m., at a temperature of 60° C., for 2 hours, with the pH of the polymerization system set at 3. There was no agglomeration or union of the resulting polymerparticles, and a globular polymer having an average particle diameter of $70\mu$ and a gel water content of 11% was produced.

EXAMPLE 2

Polymerization was carried out in the same way as in Example 1 except that, in place of 200 parts of GMA, 180 parts of GMA and 20 parts of triethylene glycol dimethacrylate were used, and as the polymerization initiator, one part of benzoyl peroxide was used, with the polymerization temperature set at 70° C. A globular polymer having an average particle diameter of 55μ and a gel water content of 13% was obtained.

EXAMPLE 3

Polymerization was carried out in the same way as in Example 1 except that the stirring speed was varied as in Table 1 below. The results of the measurement of the particle diameter of the resulting polymers are also set forth in Table 1.

TABLE 1

| Experiment No. | I | II | III | IV | V |
|---|---|---|---|---|---|
| Stirring speed (r.p.m.) | 40 | 60 | 250 | 500 | 700 |
| Particle diameter (μ) | United, deformed particles larger than 1000μ | 200–600 | 40–180 | 10–80 | Emulsified particles smaller than 10μ |

From the above Table, it is clearly understood that, when the stirring condition is out of the recommended range of the present invention (No. 1 and No. V) even though the other requisites of the invention are satisfied, it is impossible to form a good globular polymer.

The gel water content of the globular polymers (Nos. II–IV) was found to be 11%.

Next, after the globular polymer of No. III was filtered and washed, it was made into a slurry in water regulated at pH 1.5 with nitric acid. The slurry was heat-treated at 80° C. for 3 hours to form water-swollen bead-like polymer (A).

The gel water content of this polymer (A) was 83%. Both Polymers No. III and A were not soluble in hot water of 130° C., and also not soluble in organic solvent including methyl ethyl ketone which is a solvent for GMA. From this fact, it is supposed that these polymers are cross-linked.

The bead-like polymer (A) thus obtained was sieved to obtain polymer particles of intermediate sizes capable of passing through from a 150-mesh screen to a 350-mesh screen. The polymer particles were packed in a glass column, 1.5 cm in inner diameter and 30 cm in height, and were evaluated for the performance as gels for liquid chromatography. As a specimen, 0.5 cc of an aqueous solution containing NaCl and NaSCN, each 5%, was put into the column. Deionized water was used as the eluent, and the elution was carried out at an eluting speed of 60 cc/hour. NaCl showed a concentration peak at the elution volume of 22.5 cc and NaSCN at 36 cc. Thus, the separation was performed almost perfectly.

EXAMPLE 4

The globular polymer No. III produced in Example 3 was dispersed in an aqueous solution of formic acid. By varying the acid treatment conditions (pH, temperature and hours) as shown in Table 2 below, four kinds of bead-like polymers (B-E) were produced. The results of the measurement of the gel water content are also set forth in Table 2.

TABLE 2

| | Polymer name | | | |
|---|---|---|---|---|
| | B | C | D | E |
| Acid heat treatment | | | | |
| pH | 1.7 | 1.7 | 1.7 | 4 |
| Temperature (°C.) | 65 | 90 | 90 | 90 |
| Hours | 6 | 0.5 | 2 | 2 |
| Gel water content (%) | 18 | 95 | 125 | 16 |
| ○ marks show the polymers of the invention | | ○ | ○ | |

From the Table above, it is understood that modified bead-like polymers cab be provided advantageously by employing the acid heat treatment conditions of the present invention.

Also, the gel performance of the bead-like polymer (D) was evaluated similarly to Example 3, using as a specimen, an aqueous solution containing polyethylene glycol (average molecular weight: 2000) and ammonium sulfate, each 5%. Polyethylene glycol showed a concentration peak at 16.5 cc and ammonium sulfate at 29 cc. Thus the separation was performed almost perfectly.

EXAMPLE 5

Polymerization was carried out in the same way as in Example 3 (No. III) except that, in place of 200 parts of GMA, 180 parts of GMA and 20 parts of triethylene glycol dimethacrylate were used, and as the oil-soluble radical polymerization initiator, one part of benzoylperoxide was used, with the polymerization temperature set at 70° C. A globular polymer (IV) having an average particle diameter of 55μ and a gel water content of 13% was produced.

Then, 80 parts of formic acid was added to the polymerization solution to bring the pH to 1.6, and the solution was heated at 95° C. for 3 hours. A water-swollen bead-like polymer (F) having a gel water content of 65% was obtained.

The polymer particles were evaluated for the separation performance in the same way as in Example 1 as to an aqueous sample solution containing Glauber's salt, sodium chloride, sodium nitrate and sodium thiocyanate, each 5% in concentration. The elution curve shown in FIG. 1 was obtained.

What is claimed is:

1. A bead-like polymer produced by polymerizing glycidyl acrylate or glycidyl methacrylate alone or a monomer mixture composed of more than 60 weight % of glycidyl acrylate or methacrylate and at least one other ethylenically unsaturated monomer which forms the remainder, which polymer has hydroxyl groups resulting from the ring-opening of the epoxy groups of said glycidyl acrylate or methacrylate, said polymer having a gel water content value of not less than 50% and said polymer having a particle diameter greater than 10μ, which process comprises aqueous suspension polymerization of glycidyl acrylate or glycidyl methacrylate alone or a monomer mixture composed of more than 60 weight % of said glycidyl acrylate or glycidyl methacrylate and at least one other monomer which forms the remainder, in the presence of a water-soluble polymer as a dispersant in an amount sufficient to produce said bead-like polymer which contains essentially monomer units consisting of an ethylenically unsaturated carboxylic acid or a salt thereof and monomer units consisting of an ethylenically unsaturated sulfonic acid or a salt thereof, and an oil-soluble radical polymerization initiator, at a pH of from 2 to 9 and at a stirring speed of from 50 to 500 r.p.m., followed by heat treatment at a temperature above 70° C. at a pH below 3.

2. The bead-like polymers claimed in claim 1 wherein the polymer has a particle diameter of up to 600μ.

3. The bead-like polymer according to claim 1 wherein the ratio of ethylenically unsaturated carboxylic acid or salt thereof to ethylenically unsaturated sulfonic acid or salt thereof is 30 to 80%/70 to 20%.

4. A gel for liquid chromatography which comprises admixing the bead-like polymer of claim 1 with water or an aqueous solution.

5. In a method for performing liquid chromatography with a liquid chromatographic gel, the improvement which comprises employing the gel of claim 4.

* * * * *